(12) United States Patent
Ghessassi

(10) Patent No.: US 11,375,275 B2
(45) Date of Patent: Jun. 28, 2022

(54) METHOD AND SYSTEM FOR USING LIP SEQUENCES TO CONTROL OPERATIONS OF A DEVICE

(71) Applicant: Charter Communications Operating, LLC, St. Louis, MO (US)

(72) Inventor: Karim Ghessassi, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 44 days.

(21) Appl. No.: 16/688,174

(22) Filed: Nov. 19, 2019

(65) Prior Publication Data
US 2021/0152883 A1 May 20, 2021

(51) Int. Cl.
*H04N 21/442* (2011.01)
*G06F 3/01* (2006.01)
(Continued)

(52) U.S. Cl.
CPC ....... *H04N 21/44218* (2013.01); *G01S 17/89* (2013.01); *G06F 3/012* (2013.01); *G06F 3/013* (2013.01); *G06V 40/166* (2022.01); *G06V 40/20* (2022.01); *H04N 21/42203* (2013.01); *H04N 21/439* (2013.01)

(58) Field of Classification Search
CPC ....... H04N 21/44218; H04N 21/42203; H04N 21/439; H04N 21/42201; H04N 21/4223; H04N 21/42204; H04N 21/4415; H04N 21/4131; H04N 21/42202; H04N 21/44008; H04N 21/485; G01S 17/89; G06F 3/012; G06F 3/013; G06F 3/011; G06K 9/00255; G06K 9/00335; G06V 40/166; G06V 40/20; G06V 40/171; G06V 40/18; G10L 15/25
See application file for complete search history.

(56) References Cited

U.S. PATENT DOCUMENTS 8,442,820 B2 5/2013 Kim et al.
2010/0189305 A1* 7/2010 Capless .................. G10L 15/25
382/100

(Continued)

FOREIGN PATENT DOCUMENTS

EP 3432606 A1 1/2019
EP 3450372 A1 3/2019

*Primary Examiner* — Kunal Langhnoja
(74) *Attorney, Agent, or Firm* — The Marbury Law Group, PLLC

(57) ABSTRACT

A smart control system may determine whether a user is engaged with an electronic device, capture a lip sequence of the user for a period of time in response to determining that user is engaged with the electronic device, generate reduce sequence based on the captured lip sequence, determining an application with which the user is engaged, determine a current operating state of the application with which the user is engaged, determine commands that are applicable to the current operating state of the application, and determine whether the generated reduction sequence matches a comparison sequence associated with one of the determined commands. The smart control system may send a command associated with a matching comparison sequence to the application/electronic device in response to determining that the generated reduction sequence matches a comparison sequence associated with one of the determined commands.

30 Claims, 13 Drawing Sheets

(51) Int. Cl.
*G01S 17/89* (2020.01)
*H04N 21/422* (2011.01)
*H04N 21/439* (2011.01)
*G06V 40/20* (2022.01)
*G06V 40/16* (2022.01)

(56) References Cited

U.S. PATENT DOCUMENTS

| | | | |
|---|---|---|---|
| 2010/0211918 A1* | 8/2010 | Liang | G06K 9/00402 |
| | | | 715/863 |
| 2010/0332229 A1* | 12/2010 | Aoyama | G06K 9/00221 |
| | | | 704/251 |
| 2015/0127352 A1* | 5/2015 | Norsworthy | G10L 25/75 |
| | | | 704/270 |
| 2018/0260680 A1* | 9/2018 | Finkelstein | G06N 5/04 |
| 2019/0019508 A1* | 1/2019 | Rochford | G10L 15/22 |
| 2021/0042535 A1* | 2/2021 | Abbott | G06T 7/73 |

* cited by examiner

METHOD AND SYSTEM FOR USING LIP SEQUENCES TO CONTROL OPERATIONS OF A DEVICE

BACKGROUND

Modern control systems, such universal remotes and smart speakers, include built-in microphones that allow users to interact with other smart devices or internet services using their voice. For example, smart speaker systems (e.g., Google Home®, Apple HomePod®, Amazon Echo®, etc.) typically include a speaker, a microphone and a processor configured to control other smart devices (e.g., smart TVs, smart thermostats, etc.), search the Internet for information, play music, make phone calls, and perform other similar tasks. In addition, smart speakers often include a virtual assistant, which is a software service that receives the user's voice as input, identifies a command or question, interacts with other services or devices based on the command, and generates an output or response.

The microphones in these modern control systems remain on, continuously capturing and evaluating voices to detect wake-up expressions (e.g., OK Google, Alexa, etc.) or user commands. This, and other features and characteristics of modern control systems, may present a number of privacy and data protection challenges for venders, device manufacturers, and users of smart speaker systems.

SUMMARY

The various aspects of the disclosure provide methods of controlling a device, which may include determining by a processor in user equipment device whether a user is engaged with an electronic device, capturing by the processor a lip sequence of the user for a period of time in response to determining that the user is engaged with the electronic device, generating by the processor a reduction sequence based on the captured lip sequence, determining by the processor an application with which the user is engaged, determining by the processor a current operating state of the application, determining by the processor commands that are applicable to the current operating state, determining by the processor whether the generated reduction sequence matches a comparison sequence associated with one of the determined commands, and controlling by the processor in the user equipment device the device by sending a command associated with a matching comparison sequence to the application in response to determining that the generated reduction sequence matches the comparison sequence associated with one of the determined commands.

In some aspects, capturing the lip sequence of the user for the period of time may include transmitting light detection and ranging (LIDAR) signals towards a face of the user, capture reflections of the LIDAR signals off points on the face of the user, using the captured reflections to identify the points on lips of the user, and determining a polygon based on the identified points on the lips of the user. In some aspects, using the captured reflections to identify the points on the lips of the user may include using the captured reflections to identify the points and angles, and determining the polygon based on the identified points may include determining the polygon based on the identified points and the identified angles.

Some aspects may include generating a captured sequence information structure based on the determined polygon, in which generating the reduce sequence based on the captured lip sequence may include generating the reduce sequence based on the generated captured sequence information structure. In some aspects, determining the application with which the user is engaged may include selecting the application operating in the foreground of the electronic device. In some aspects, selecting the application operating in the foreground of the electronic device may include selecting a video player application operating in the foreground of the electronic device. In some aspects, determining whether the user is engaged with the electronic device may include determining whether the user is looking towards an electronic display of the electronic device.

In some embodiments, a device may be controlled by a user equipment device after determining that the user is engaged with an electronic device. For example, the device may be a DVD player or gaming system that outputs content to a television (i.e., electronic device) that the user is engaged with by watching the television. The user equipment device may be, for example, a set top box, an audio-video receiver, or a smart speaker. In such embodiments, the user equipment device may determine whether a user is engaged with the television (e.g., electronic device). The set-top box (e.g., user equipment) may capture a lip sequence of the user for a period of time in response to determining that the user is engaged with the television (e.g., electronic device). The processor of the set-top box (e.g., user equipment) may generate a reduction sequence based on the captured lip sequence. The processor of the set-top box (e.g., user equipment) may determine an application with which the user is engaged. For example, the user may be watching a movie being payed from a DVD player. Thus, the application may be the output of the audio and video stored on the DVD. The processor of the set-top box (e.g., user equipment) may determine a current operating state of the application and determine commands that are applicable to the current operating state. For example, if the movie is playing, the DVD player application commands may be to stop, fast forward, rewind, pause, etc. The processor of the set-top box (e.g., user equipment) may determine whether the generated reduction sequence matches a comparison sequence associated with one of the determined commands. The processor of the set-top box (e.g., user equipment) may the DVD player (e.g., device) by sending a command associated with a matching comparison sequence to the application in response to determining that the generated reduction sequence matches the comparison sequence associated with one of the determined commands.

In some embodiments, the device (e.g., DVD player, video streaming app such as Netflix®, Amazon Prime®, etc.) may be one and the same as the electronic device with which the user is engaged. For example, the DVD player or video streaming application may be integrated into the television (e.g., electronic device). In such embodiments, the user equipment device (e.g., a set top box, an audio-video receiver, or a smart speaker) may determine the user's engagement with the device/electronic device and provide the control for the device/electronic device.

In other embodiments, the device, electronic device, and user equipment device may also be one and the same. In such embodiments, the functionality of the device (e.g., DVD player, video streaming application, etc.) and the user equipment device (e.g., a set top box, an audio-video receiver, or a smart speaker) may be integrated into the electronic device (e.g., television).

While the various embodiments herein may be discussed from the perspective of a fully integrated device (i.e., the device, electronic device and user equipment device being integrated into a single device), the various embodiments in which the functionality may be divided among a plurality of devices is within the contemplated scope of disclosure.

Further aspects include a user equipment device (e.g. smart television, set top box, control system device, etc.) that includes a processor configured with processor-executable instructions to perform operations of any of the methods summarized above. Further aspects include a non-transitory processor-readable storage medium having stored thereon processor-executable instructions configured to cause a processor in a user equipment device to perform operations of any of the methods summarized above. Further aspects include a user equipment device having means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1A:
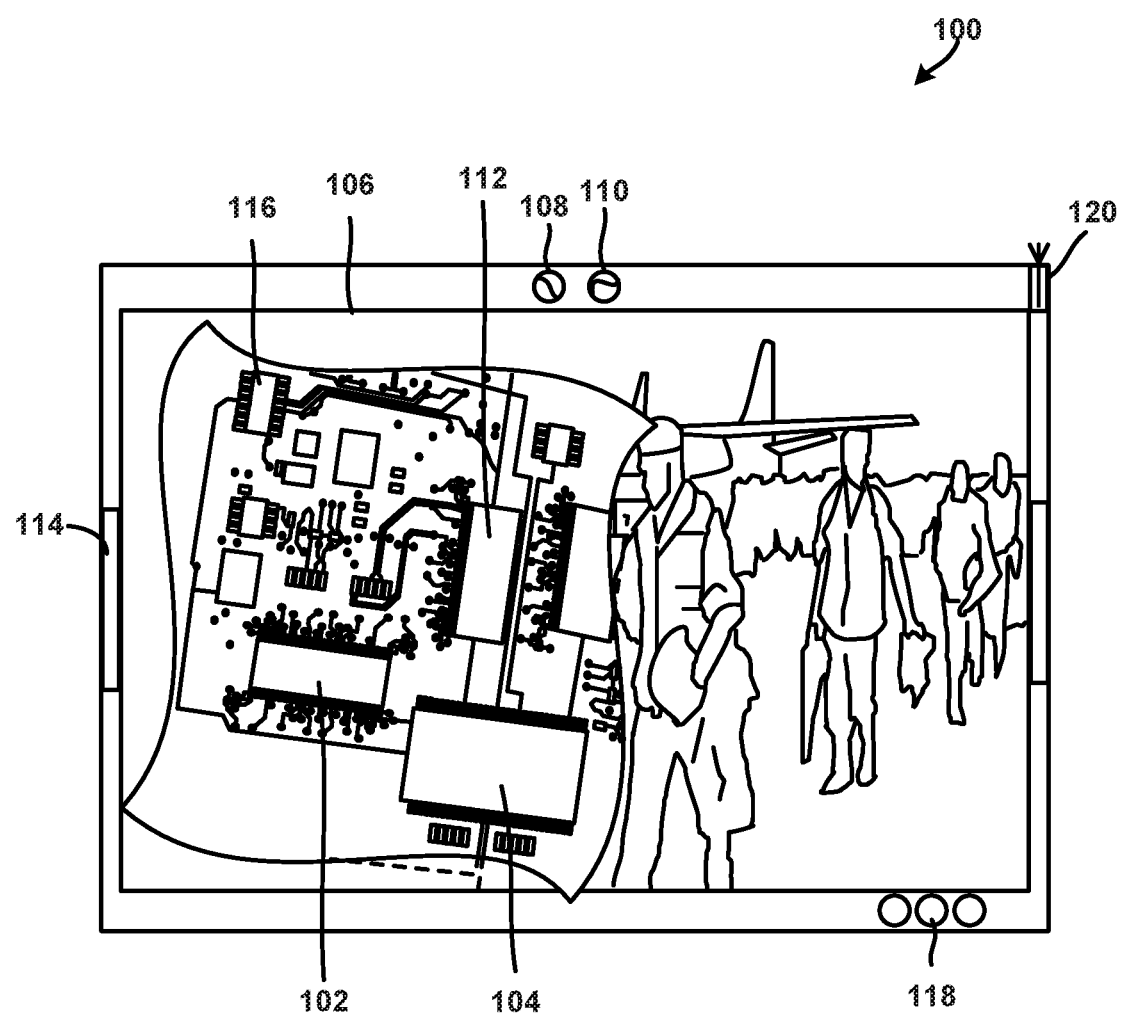
FIG. 1A is a component block diagram of a smart television (TV) that integrates the functionality of a device, use equipment device and electronic device into a single device suitable for implementing some embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "computing device," "electronic device," "user equipment (UE) device" and simply "device" may be used generically and interchangeably herein to refer to any one or all of satellite or cable set top boxes, servers, rack mounted computers, routers, voice controllers, smart televisions, smart speakers, smart remote controls, smart locks, smart lighting systems, smart switches, smart plugs, smart doorbells, smart doorbell cameras, smart air pollution/quality monitors, smart alarms (e.g., smoke alarms, security systems, etc.), smart thermostats, media players (e.g., DVD players, ROKU™, AppleTV™, etc.), digital video recorders (DVRs), modems, routers, network switches, residential gateways (RG), access nodes (AN), bridged residential gateway (BRG), fixed mobile convergence products, home networking adapters and Internet access gateways that enable users to access communications service providers' services and distribute them around their house via a local area network (LAN), tablet computers, personal computers, laptop computers, netbooks, ultrabooks, smartphones, mobile devices, cellular telephones, palm-top computers, personal data assistants (PDA's), Internet-of-things (IOT) devices, smart appliances, personal or mobile multi-media players, wireless electronic mail receivers, multimedia Internet enabled cellular telephones, gaming systems (e.g., PlayStation™, Xbox™, Nintendo Switch™, etc.) head-mounted devices, and similar electronic devices which include a programmable processor, a memory and circuitry for sending and/or receiving wireless communication signals to/from wireless communication networks. While the various embodiments are particularly useful in smart devices, such as smart televisions, the embodiments are generally useful in any electronic device that includes communication circuitry for accessing cellular or wireless communication networks.

In some embodiments, a device may be controlled by a user equipment device after determining that the user is engaged with an electronic device. For example, the device may be a DVD player or gaming system that outputs content to a television (i.e., electronic device) that the user is engaged with by watching the television. The user equipment device may be, for example, a set top box, an audio-video receiver, or a smart speaker. In such embodiments, the user equipment device may determine whether a user is engaged with the television (e.g., electronic device). The set-top box (e.g., user equipment) may capture a lip sequence of the user for a period of time in response to determining that the user is engaged with the television (e.g., electronic device). The processor of the set-top box (e.g., user equipment) may generate a reduction sequence based on the captured lip sequence. The processor of the set-top box (e.g., user equipment) may determine an application with which the user is engaged. For example, the user may be watching a movie being payed from a DVD player. Thus, the application may be the output of the audio and video stored on the DVD. The processor of the set-top box (e.g., user equipment) may determine a current operating state of the application and determine commands that are applicable to the current operating state. For example, if the movie is playing, the DVD player application commands may be to stop, fast forward, rewind, pause, etc. The processor of the set-top box (e.g., user equipment) may determine whether the generated reduction sequence matches a comparison sequence associated with one of the determined commands. The processor of the set-top box (e.g., user equipment) may the DVD player (e.g., device) by sending a command associated with a matching comparison sequence to the application in response to determining that the generated reduction sequence matches the comparison sequence associated with one of the determined commands.

In some embodiments, the device (e.g., DVD player, video streaming app such as Netflix®, Amazon Prime®, etc.) may be one and the same as the electronic device with which the user is engaged. For example, the DVD player or video streaming application may be integrated into the television (e.g., electronic device). In such embodiments, the user equipment device (e.g., a set top box, an audio-video receiver, or a smart speaker) may determine the user's engagement with the device/electronic device and provide the control for the device/electronic device.

In other embodiments, the device, electronic device, and user equipment device may also be one and the same. In such embodiments, the functionality of the device (e.g., DVD player, video streaming application, etc.) and the user equipment device (e.g., a set top box, an audio-video receiver, or a smart speaker) may be integrated into the electronic device (e.g., television).

While the various embodiments herein may be discussed from the perspective of a fully integrated device (i.e., the device, electronic device and user equipment device being integrated into a single device), the various embodiments in which the functionality may be divided among a plurality of devices is within the contemplated scope of disclosure.

A number of different methods, technologies, solutions, and/or techniques (herein collectively "solutions") may be used for determining the location, position, or orientation of a target point (a point on the facial structure surrounding the user's lips or eyes, corner of the lips or eye, etc.), any or all of which may be implemented by, included in, and/or used by the various embodiments. Such solutions include trilateration, multi-lateration, degrees of freedom (DOF), time of arrival (TOA), time-of-flight (TOF), observed time difference of arrival (OTDOA), and angle of arrival (AOA). For example, a computing device may be configured to transmit sound (e.g., ultrasound), light or a radio signal to a target point, measure how long it takes for a reflection of the sound, light or radio signal to be detected by a sensor on the computing device, and use any or all of the above techniques (e.g., time of arrival, angle of arrival, etc.) to estimate the distance and angle between the computing device and the target point.

The phrase "six degrees of freedom (6-DOF)" may be used herein to refer to the freedom of movement of the head (or face, eyes, lips, etc.) of the user with respect to a UE device (e.g., smartphone, smart appliance, IoT device, etc.) in three-dimensional space or with respect to three perpendicular axes. The user's head may change its position in a forward/backward direction or along the X-axis (surge), in a left/right direction or along the Y-axis (sway), and in an up/down direction or along the Z-axis (heave). The head may change its orientation through rotation along the three perpendicular axes. The term "roll" may refer to rotation along the longitudinal axis or tilting side to side on the X-axis. The term "pitch" may refer to rotation along the transverse axis or tilting forward and backward on the Y-axis. The term "yaw" may refer to rotation along normal axis or turning left and right on the Z-axis.

The terms "component," "system," "engine," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Computing device interfaces (e.g., Human Computer Interface, etc.) are becoming increasingly complex, particularly for smart appliances and IoT devices. Complex functionality results in a multitude or a large plurality of possible commands and functions for the user to execute. Users find it increasingly challenging to access the full functionality provided by these devices/systems. In addition to diminishing the user experience, these increasing complex interfaces pose a challenge for service providers and system manufacturers because the training cycle associated with these corresponding devices is becoming longer, more complex, and more expensive. The increase in complexity may also increases the support costs (e.g., for onboarding existing or new users, etc.) associated with software or hardware upgrades to these devices.

Some control systems, such smart universal remote controls and smart speakers, include built-in microphones that accept user voice input. While these systems allow users to more fully utilize the functionality provided by their devices, they also include significant limitations and disadvantages. For example, a smart speaker system (e.g., Siri, Alexa, etc.) may capture voice recordings, use Artificial Intelligence to translate words within the recording into text, translate the text into commands, and send the commands to other devices (e.g., TVs, thermostats, mobile devices, etc.). Such a system also commonly includes a supervised learning stage in which a human manually analyzes the recording to identify commands (e.g., to account for individual or regional differences in how certain words are pronounced, etc.). Privacy concerns start to outweigh the advantage and convenience of voice commands as such devices must constantly "listen" for potential commands. As a result, users may become guarded from using such devices for fear that all of their conversations will be recorded and transmitted across a communication network. While such smart universal remote controls and smart speakers may eventually delete the data/recordings, users are unable to readily control what gets recorded, who listens to the recording, who reviews the data, how long the recording and/or its associated data is kept, whether the recordings contain private conversations or information that the user does not want to share, etc.

Further, new and emerging data protection and privacy laws, such as General Data Protection Regulation (EU) 2016/679 (GDPR), may limit the types of information that may be recorded and sent to a cloud server for analysis. As more and more of these laws are implemented, systems that capture and evaluate voices (e.g., to detect wake-up expressions, user commands, etc.) could create liabilities for their users, vendors or device manufacturers.

In addition, a user might not have access to or wish to utilize audible voice commands in a public setting (e.g., airplane, bus, train, taxi, etc.). Even if they do, there are courtesy and privacy issues around the user sending voice command to a screen when there are other individuals nearby (e.g., sitting next to the user in an airplane, etc.). For example, it may be rude or annoying to an individual sitting next to the user if the user provides detailed instructions (e.g., open, play, stop, menu, etc.) to their personal electronic device (e.g., smartphone, tablet, etc.). For these and other reasons, control systems such as smart speakers that capture or use the user's voice/words have not been, or will not be, fully utilized by consumers to control their devices.

Some control systems may include a "night mode" that allows users to interact with the smart universal remote controls and/or smart speakers without audible speech and/ or in low light conditions. A control system that supports "night mode" may capture a user's lip (and/or mouth) movements, translate the user's lip movements to words, store the words in memory, compare the words to commands, and apply the corresponding command to the device. Because these systems do not determine the context in which a command is given (e.g., while the user is facing a smart TV and watching a movie, etc.), there could be thousands of relevant applications and millions of relevant commands. Determining the specific command that was issued by the user could consume an excessive amount of the device's often limited processing, memory or battery resources. Alternatively, the control system could send the words to server in a cloud network for analysis. However, the transmission of the commands through a cloud communication network could be a violation of the user's privacy and/or violate a data protection or privacy law (e.g., GDPR).

The embodiments disclosed herein include control systems, which may be implemented as stand-alone devices or within another computing device or user equipment device (e.g., cable box, smart TV, etc.), that overcome the above described limitations of existing or conventional solutions. Control systems configured in accordance with the embodiments may not require the inclusion or use of a microphone, may not be required to capture voice recordings, may not be required to translate voice to text/commands, may not be required to translate lip movements into words, may not be required to store the user's words in memory, and may not be required to transmit information collected from the user to a server or cloud network. As a result, control systems configured in accordance with the embodiments may allow users to more fully access the functionality provided by modern electronic devices and control systems without compromising their privacy or data security and/or without violating any existing or foreseeable data protection or privacy laws.

A control system configured in accordance with the embodiments may be configured to scan its physical environment (e.g., by activating a sensor, using LIDAR, etc.) to determine whether a user is engaged with an electronic device. The electronic device may be a UE device in which the control system is included or another UE device that is communicatively coupled to the control system. In response to determining that the user is engaged, the control system may capture user's lip sequence (this may also be referred to as the user's mouth sequence) over a timeline, generate one or more captured sequences based on the user's captured lip sequences, and/or generate one or more reduction sequences. For example, the control system may transmit LIDAR signals, capture their reflections off certain points on the user's face (e.g., areas surrounding the user's mouth or lips, etc.), use captured reflections to identify edge points of the user's lips, determine the angles between the edge points, compute polygons based on the edge points and angles captured during the timeline, generate a captured sequence based on the computed polygons, and generate a reduction sequence based on the captured sequence.

The control system may be configured identify or determine the application (e.g., video player, heating, ventilation, and air conditioning (HVAC) controller, etc.) with which the user is engaged, determine the current operating state of the application or relevant device (e.g., is playing movie, is cooling, etc.), determine the commands (e.g., "PAUSE," "STOP," "FAN OFF," etc.) that are applicable to the current operating state of the application/device, and compare a reduction sequence to the comparison sequences associated with the determined commands. In response to determining that a reduction sequence matches a comparison sequence, the control system may select a command associated with a matching comparison sequence, and send the selected command to the application/device to control its operations.

Each captured sequence, reduction sequence, and/or comparison sequence may be an information structure that characterizes a sequence of lip movements over a timeline. These information structures may include any or all of edge point values, vertex values, corner values, side values, angle values, capture time values, polygon values, polygon mesh values, polygon models, and/or frames. For example, the information structures may include four (4) edge points and angles that may be used to determine vertices/corners and edges/sides of a polygon shape (e.g., a quadrilateral shape, etc.). Each polygon shape may correspond to a frame that identifies a shape of the user's lips at a point in time. A series/sequence of these polygon shapes/frame over a period of time (e.g., 0.5 seconds, 0.75 seconds, 1 second, 1.25 seconds, etc.) may identify a pattern of lip/mouth movements that may correspond to a command.

A reduction sequence may include a subset of the information included in a captured sequence. For example, if a captured sequence includes polygons or frames that identify the shape of the user's lip/mouth at every millisecond, the corresponding reduction sequence may include only the polygons or frames that identify significant changes in the shape of the user's lip/mouth. A comparison sequence may include reference or test values (e.g., a sequence of reference polygons, etc.) and an associated command (e.g., play, pause, cool, toast, etc.). The comparison values may be generated in a server computing device and preloaded/ downloaded/stored on a local memory associated with the control system.

A control system configured in accordance with the embodiments may analyze a user's lip/mouth movement without audible commands and/or in a darkened space or total darkness. For example, the control system may use LIDAR to track specific points within the user's face, and analyze the input data points to generate output commands within dynamic context. While the user might speak naturally, the control system does not capture, store or process the user's audible voice. In addition, all the processing is handled locally (on the control system device itself), thereby providing full privacy protection to the end user. None of the captured user commands or audio may be transmitted via a cloud communication network. Thus, any user data remains within the user's immediate environment.

FIG. 1A illustrates components in a user equipment device in the form of a smart television 100 that includes a control system that may be configured to use lip sequences to control its operations in accordance with some embodiments. In the embodiments illustrated in FIG. 1, the functionality of the device, user equipment device and electronic device may be integrated into the singular smart television 100. In the example illustrated in FIG. 1, the smart television 100 includes a processor 102 coupled to internal memory 104, an electronic display 106, a facial sensor 108, an image sensor 110, sensor array 112, speakers 114, communications circuitry 116 (e.g., transceiver, a wireless radio, etc.), user interface elements 118 (e.g., lights, buttons, etc.), and an antenna 120 for sending and receiving electromagnetic radiation and/or connecting to a wireless data link.

In some embodiments, the facial sensor 108 may include a LIDAR camera that uses laser pulses to provide a three-dimensional representation of objects in front of the smart television 100. In some embodiments, the processor 102 may be digital signal processor (embedded chip) configured to provide real-time processing of captured scans from the LIDAR camera. In some embodiments, the memory 104 may be an embedded storage system that fits within a chip. In some embodiments, the storage capacity of the memory 104 may be adjusted to handle anticipated patterns (e.g., comparison sequences, etc.) that are used for classification. In some embodiments, the communications circuitry 116 and/or antenna 120 may be used to communicate with a server in a cloud network that is configured to aggregate and generate a list of patterns used to match specific words or other pre-set 2D plot templates. The aggregated data may be used to optimize all collected patterns and send the optimized (smaller) list to the smart television 100, which may receive the optimized (smaller) list via the communications circuitry 116 and/or antenna 120 and store the received list in the memory 104.

The facial sensor 108 may be configured to acquire data from the user's facial features (e.g., the user eyes, noise, lips, jaw, etc.), and send the acquired data to the sensor array 112 and/or processor 102. As part of these operations, the facial sensor 108 may produce or transmit any of a variety of signals, including any or all of sound navigation ranging (sonar) signals, radio detection and ranging (radar) signals, light detection and ranging (lidar) signals, sound waves (e.g., ultrasound from a piezoelectric transducer, etc.), small flashes of light (e.g., infrared light, light from an light emitting diode (LED) laser, etc.), and/or any other similar signal, wave, or transmission known in the art. The facial sensor 108 may capture the signals' reflections off one or more points on a surface of the user's face, and send the corresponding data to the sensor array 112 and/or processor 102.

The sensor array 112 and/or processor 102 may be configured to use the data received from the facial sensor 108 to isolate the user's face and/or determine whether the user intends to engage with the smart television 100. For example, the processor 102 may use the received data to determine the position, orientation or direction of the user's head, face or lips and/or to determine the gaze direction the user's eyes. The processor 102 may determine that the user intends to engage with the smart television 100 based on the user's gaze direction (e.g., in response to determining that the user is looking directly at the electronic display 106, etc.), direction of the user's head, position of the user's face, orientation of the user's lips, or any combination thereof. The sensor array 112 and/or processor 102 may also use the data received from the facial sensor 108 to generate a captured sequence.

In some embodiments, the processor 102 may be configure to use data received from the facial sensor 108 (e.g., scans from the LIDAR camera) to locate a face within the captured three-dimensional frames. In some embodiments, the facial sensor 108 may be coupled to a custom onboard chipset that could be used for fast detection.

The image sensor 110 may be configured to capture real-world images from the smart television's 100 physical environment, and send the corresponding image data to the processor 102. In some embodiments, the processor 102 may be configured to use localization and mapping techniques, such as simultaneous localization and mapping (SLAM), visual simultaneous localization and mapping (VSLAM), and/or other techniques known in the art to construct a map of the viewable environment, identify the user's face within the constructed map, and/or determine distances and angles between the user's face/lips and the image sensor 110 or smart television 100. The processor 102 may use the image information and the determined distances/angles to generate a captured sequence information structure and/or determine whether the user intends to engage with the smart television 100 to issue commands.

In some embodiments, the image sensor 110 may include a monocular image sensor that captures images or frames from the environment surrounding the image sensor 110. The processor 102 may receive the captured images, identify prominent objects or features within the captured image, estimate the dimensions and scale of the features in the image, compare the identified features to each other and/or to features in test images having known dimensions and scale, and identify correspondences based on the comparisons. Each correspondence may be a value set or an information structure that identifies a feature (or feature point) in one image as having a high probability of being the same feature in another image (e.g., a subsequently captured image). The processor 102 may use the identified correspondences to determine distances and angles between the user's face/lips and the image sensor 110 or smart television 100. The processor may generate the captured sequence information structure based on determined distances and angles between the user's lips.

The sensor array 112 may include, or may be coupled to, any or all of the processor 102, facial sensor 108, image sensor 110, eye-tracking sensor, an infrared (IR) sensor, an inertial measurement unit (IMU), a laser distance sensor (LDS), and an optical flow sensor, and/or other sensors configured to detect the presence of a user's face, the position, orientation or direction of user's face, movements of facial features (e.g., eye, jaw, lip, etc.), the distance between the user's face and the smart television 100, etc. For example, the sensor array 112 may include an optical flow sensor that measures optical flow or visual motion, and outputs measurements based on the optical flow/visual motion. An optical flow may identify or define the pattern of apparent motion of objects, surfaces, and edges in a visual scene caused by the relative motion between an observer and a scene. The sensor array 112 may generate and send an optical flow or its associated measurements to the processor 102, which may receive and use the information for motion detection, object segmentation, time-to-contact information, focus of expansion calculations, motion compensated encoding, stereo disparity measurements, and/or other similar computations or techniques. The processor 102 may use any or all such computations or techniques to determine whether user intends to engage with the smart television 100 and/or to generate captured sequence information structures.

In various embodiments, the sensor array 112 may include any or all of a gyroscope, an accelerometer, a magnetometer, a magnetic compass, an altimeter, an odometer, a pressure sensor, an optical reader, a monocular image sensor, sensors for scanning/collecting information from the user's environment (e.g., room, etc.), geo-spatial positioning sensors (e.g., global positioning system (GPS) transceiver, etc.), sensors for monitoring physical conditions (e.g., location, motion, acceleration, orientation, altitude, etc.), distance measuring sensors (e.g., a laser, sonic range finder, etc.), orientation sensors (e.g., up, down, level, etc.), and other sensors that detect motion, gestures (e.g., hand movements) and/or lip movements. The processor 102 may be configured to use any or all such information collected by the sensor array 112 to determine whether the user is viewing or paying attention to the electronic display 106 (e.g., via information collected from a camera, motion sensor, etc.), whether the user is in close proximity to the smart television 100, or whether the user is engaged in an activity (e.g., moving, entering text in a different device, making a voice call, etc.) that indicates the user is not actively engaged with the smart television 100. The processor 102 may also be configured to use any of all of the information received from the sensor array 112 to generate a captured sequence information structure.

The communications circuitry 116 may be coupled to the processor 102 and configured to establish data connections with a network, such as a local area network, a service provider network, a cloud network or the Internet. The smart television 100 may communicate with other devices via a direct communication link (e.g., wireless data link, etc.), through a central server, via short-range radio technologies (e.g., Bluetooth®, WiFi, etc.), via peer-to-peer connections, or via any other known communication technologies. The processor 102 may be configured to receive comparison sequences from the network (e.g., cloud network, Internet, etc.) via the communications circuitry 116 and/or antenna 120. Each comparison sequence may be an information structure that includes values that identify edge points and angles that form one or more rectangular shapes. Each comparison sequence may include may be associated with a command (e.g., open, start, pause, cool, submit, etc.).

The user interface elements 118 may include indicator lights that show whether the processor 102 has determined that the user is currently engaged with the smart television 100. For example, a user interface element 118 may turn green to indicate that the processor 102 has determined that the user is currently engaged, and is ready to collect lip movement information to identify commands. The user interface element 118 may turn black or off to indicate that the processor 102 has determined that the user is not currently engaged, the processor 102 is not collecting lip movement information, and/or that the processor 102 is not currently attempting to identify commands based on the user's lip movements. The user interface element 118 may turn red to indicate that there has been an error, orange to indicated that the user is not lined up properly with respect to the smart television 100, etc.

The smart television 100 or its control system (e.g., processor 102, facial sensor 108, sensor array 112, etc.) may be equipped with, coupled to, or communicate with a variety of additional sensors, including a gyroscope, accelerometers, a magnetometer, a magnetic compass, an altimeter, a camera, an optical reader, an orientation sensor, a monocular image sensor, and/or similar sensors for monitoring physical conditions (e.g., location, motion, acceleration, orientation, altitude, etc.) or gathering information that is useful for employing SLAM techniques.

In an embodiment smart televisions 100 as illustrated in FIG. 1A, the processor 102 in the smart television 100 may be configured to control the smart television 100 by determining whether a user is engaged with the smart television 100, capturing (e.g., by working in conjunction with the facial sensor 108, image sensor 110, sensor array 112, etc.) a lip sequence of the user for a period of time in response to determining that the user is engaged with the smart television 100, generating a reduction sequence based on the captured lip sequence, determining an application with which the user is engaged, determining a current operating state of the application, determining commands that are applicable to the current operating state, determining whether the generated reduction sequence matches a comparison sequence associated with one of the determined commands, and sending a command associated with a matching comparison sequence to the application in response to determining that the generated reduction sequence matches the comparison sequence associated with one of the determined commands.

Figure 1B:
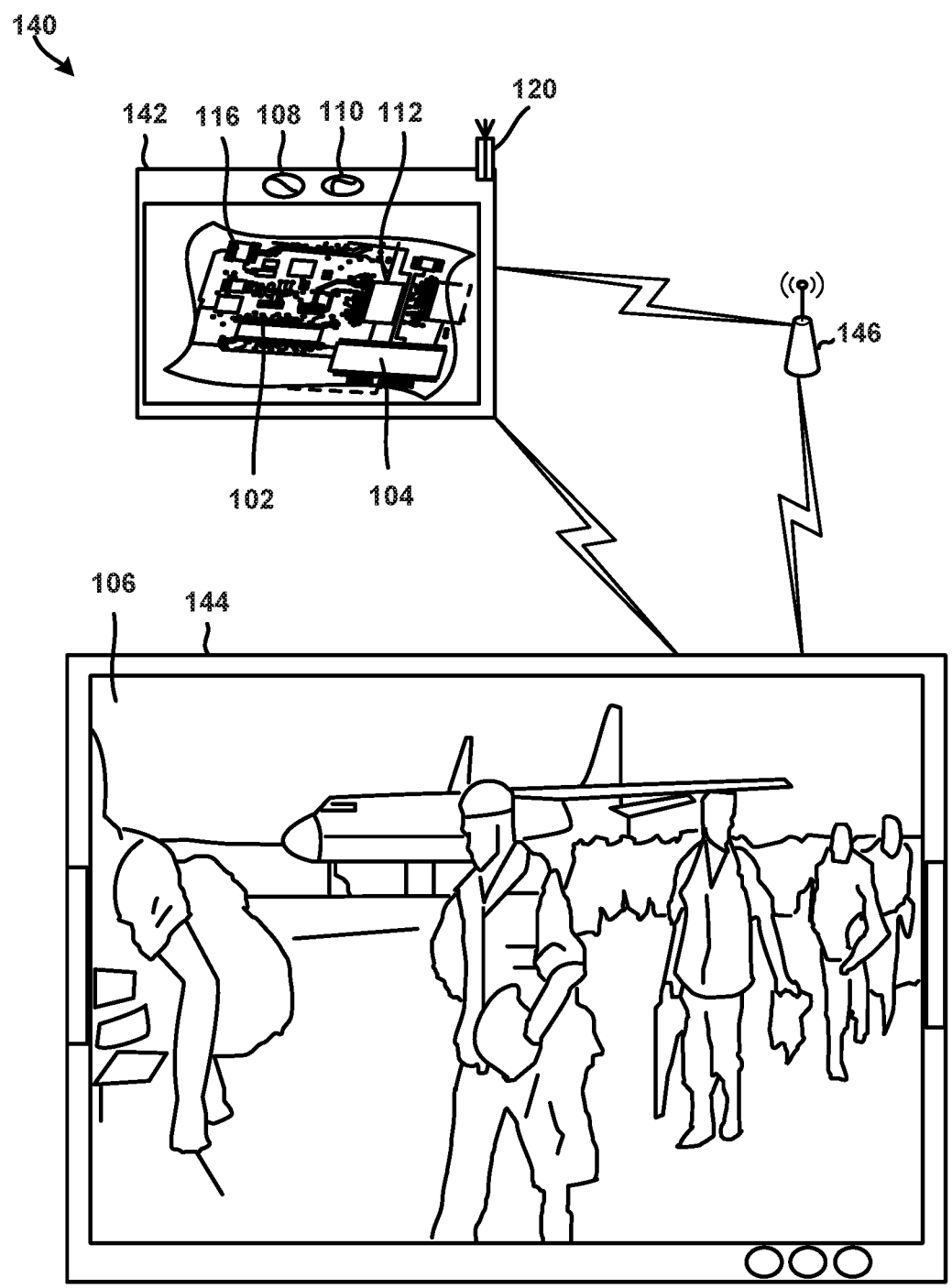
FIG. 1B is a component block diagram of a smart television (TV) that integrates the functionality of a device and electronic device and includes a user-equipment device that may control the device and electronic device suitable for implementing some embodiments.
Figure 1C:
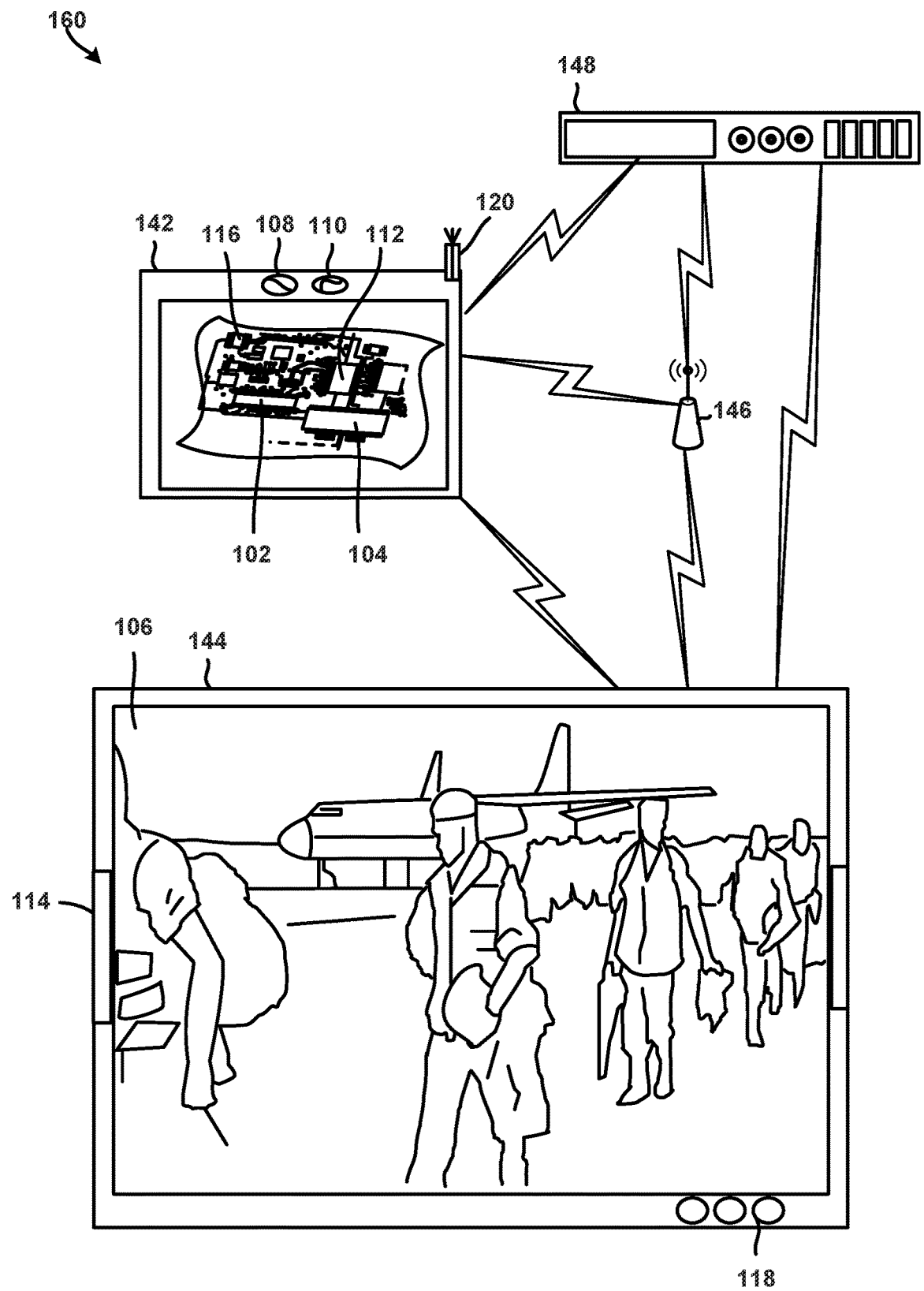
FIG. 1C is a component block diagram of a systems that includes a device, an electronic device and a user-equipment device suitable for implementing some embodiments.

FIGS. 1B and 1C illustrate communication networks 140, 160 that include a control system device 142 that could be configured to implement some embodiments. In particular, FIGS. 1B and 1C illustrates that the processor 102, internal memory 104, facial sensor 108, image sensor 110, sensor array 112, communications circuitry 116 and an antenna 120 discussed above with reference to FIG. 1A may be implemented as part of a separate control system device 142. The control system device 142 may be an independent "stand-alone" control system or implemented as part of another user equipment device (e.g., satellite or cable set top box, smart speaker system, smart controller, etc.) that is separate from the television 144 or the component that includes the electronic display 106 with which the user engages.

In the example illustrated in FIG. 1B, the control system device 142 (i.e., user equipment device) includes indirect or direct (wired or wireless) communication links to the television 144 (e.g., device and electronic device integrated into a singular device) and access point 146. For example, the control system device 142 may send and receive information to and from the television 144 directly or indirectly via the access point 146.

With reference to FIG. 1B, the processor 102 in the control system device 142 (i.e., user equipment device) may be configured to control the television 144 by determining whether a user is engaged with the television 144 (or electronic display 106 of the television 144), capturing a lip sequence of the user (e.g., by working in conjunction with the facial sensor 108, image sensor 110, sensor array 112, etc.) for a period of time in response to determining that the user is engaged with the television 144, generating a reduction sequence based on the captured lip sequence, determining an application with which the user is engaged, determining a current operating state of the application, determining commands that are applicable to the current operating state, determining whether the generated reduction sequence matches a comparison sequence associated with one of the determined commands, and sending a command associated with a matching comparison sequence to the application in response to determining that the generated reduction sequence matches the comparison sequence associated with one of the determined commands.

In some embodiments the control system and the device to be controlled may be integrated into a single device. For example, the control system may be integrated into a cable set top box that is coupled to a television. In these embodiments, sending the command associated with the matching comparison sequence to the application may include sending the command to an application (e.g., media player, etc.) operating on the control system device 142.

In other embodiments (e.g., embodiments in which the control system is implemented as an independent "stand-alone" control system, etc.), sending the command associated with the matching comparison sequence to the application may include sending the command to the television 144 for controlling an application (e.g., media player, etc.) operating on the television 144.

In the example illustrated in FIG. 1C, the control system device 142 (i.e., user equipment device) includes indirect or direct (wired or wireless) communication links to a cable set top box 148 (i.e., device to be controlled or simply "device"), the television 144, and the access point 146. Further, each of the of the components in the communication network 160 (e.g., control system device 142, television 144, access point 146 and cable set top box 148) include direct and/or indirect (wired or wireless) communication links every other component in the communication network 160. As such, each component (e.g., 142-148) may send and receive information to and from every other component (e.g., 142-148) directly or indirectly (e.g., through the access point 142, etc.).

With reference to FIG. 1C, the processor 102 in the control system device 142 (i.e., user equipment device) may be configured to control the cable set top box 148 (i.e., device) by determining whether a user is engaged with the television 144 (i.e., electronic device) and/or cable set top box 148 (which could be based on user preferences or settings), capturing a lip sequence of the user (e.g., by working in conjunction with the facial sensor 108, image sensor 110, sensor array 112, etc.) for a period of time in response to determining that the user is engaged, generating a reduction sequence based on the captured lip sequence, determining an application with which the user is engaged (e.g., media player operating on the cable set top box 148, etc.), determining a current operating state of the application, determining commands that are applicable to the current operating state, determining whether the generated reduction sequence matches a comparison sequence associated with one of the determined commands, and sending a command associated with a matching comparison sequence to the application in response to determining that the generated reduction sequence matches the comparison sequence associated with one of the determined commands.

In various embodiments, sending the command associated with the matching comparison sequence to the application may include sending the command to the cable set top box 148 and/or to the television 144, either directly or via the access point 146.

Figure 2A:
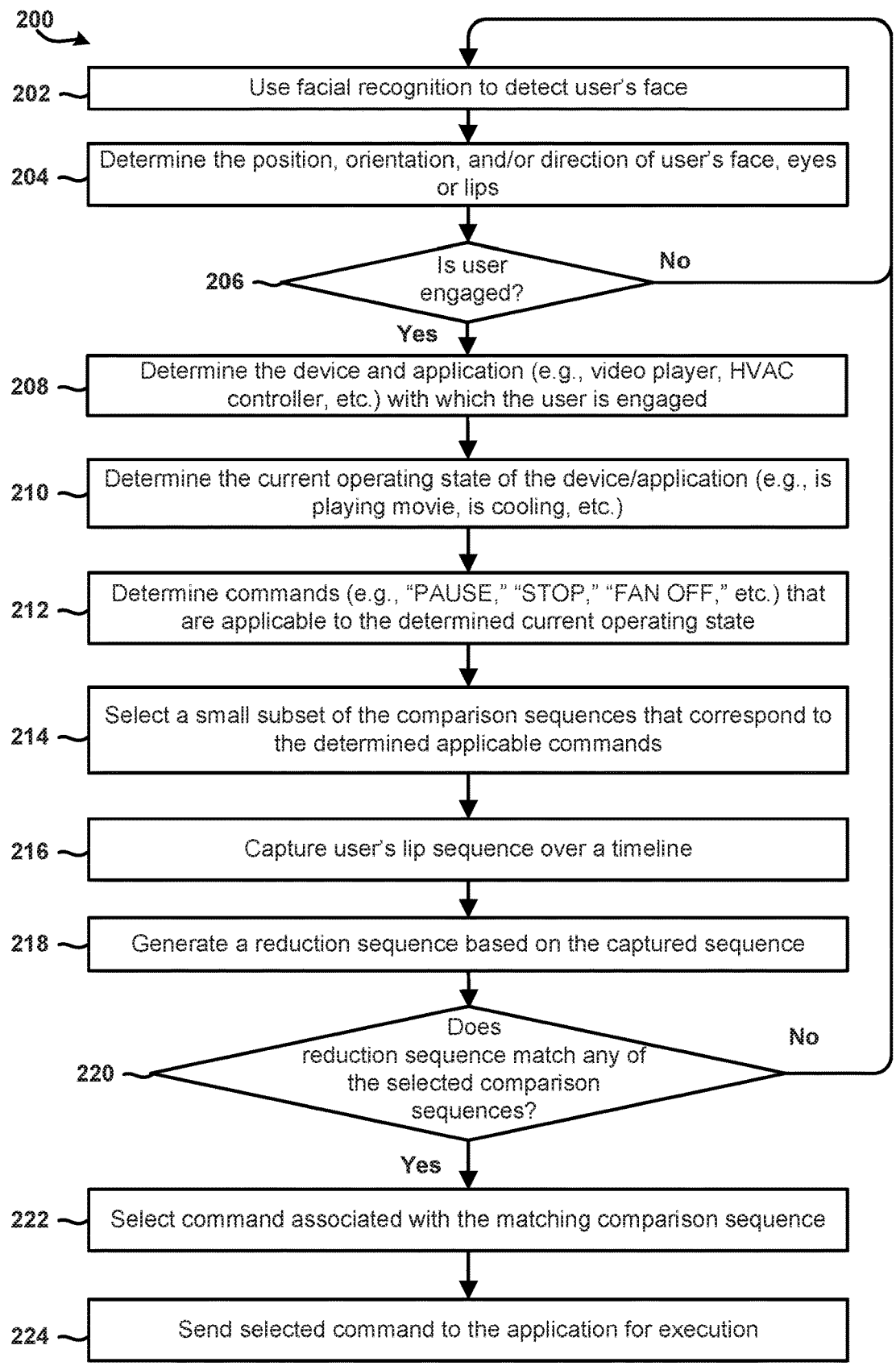
FIGS. 2A and 2B are process flow diagrams illustrating methods of using lip sequences to control the operations of an application or device in accordance with some embodiments.

FIG. 2A illustrates a method 200 of using lip sequences to control the operations of a device (e.g., smart television 100 illustrated in FIG. 1A, television 144 illustrated in FIG. 1B, cable set top box 148 illustrated in FIG. 1C, etc.) in accordance with some embodiments. Method 200 may be performed by a processor (e.g., 102) that is included in, or communicatively coupled to, the device that is controlled (e.g., smart television 100 illustrated in FIG. 1A, television 144 illustrated in FIG. 1B, cable set top box 148 illustrated in FIG. 1C, etc.). Method 200 may be performed after the processor downloads from a cloud server or otherwise receives and stores comparison sequences in a datastore. Each of the comparison sequences may be an information structure that includes edge point values, vertex values, corner values, side values, angle values, capture time values, and/or polygon values. In addition, each comparison sequence may be associated with a device, application, and/or command.

In block 202, the processor (e.g., 102) may scan its physical environment (e.g., by activating the facial sensor 108, image sensor 110, using LIDAR, etc.) and use facial recognition techniques to determine whether a user's face is present within the vicinity (e.g., in the same room as, etc.) of the device. For example, the processor may cause a facial sensor 108 to produce or transmit signals, capture their reflections, determine based on the captured reflections whether there is an object in close proximity (e.g., within 10 feet, etc.) to the device, and determine whether any detected object resembles a user's face. As another example, the processor may capture an image of the device's surrounding environment, analyze the captured image to identify prominent features within the captured image, and compare the identified features to test images of a human face, and determine that a user's is present within the vicinity of the device based on the comparisons.

In block 204, the processor may compute or determine the position, orientation, and/or direction (e.g., gaze direction, etc.) of user's face, eyes or lips. For example, the processor may transmit LIDAR signals, capture their reflections, and use captured reflections to determine the position, orientation, and/or direction of user's face, eyes or lips. As another example, the processor may capture an image of the device's surrounding environment, analyze the captured image to identify prominent features within the captured image, compare the identified features to test images to estimate the dimensions and scale of the features in the image, compare the identified features to each other and/or to features in test images having known dimensions and scale, identify correspondences based on the comparisons, and use the identified correspondences to determine the position, orientation, and/or direction of user's face, eyes or lips.

In determination block 206, the processor may determine whether the user is engaged with an electronic device (e.g., smart television 100, television 144, cable set top box 148, etc.) based on the user's gaze direction, the orientation of the user's head, the position of the user's eyes, and/or any other technique known in the art or discussed in this application. In response to determining that the user is not engaged (i.e., determination block 206="No"), the processor may continue to continuously or periodically scan its physical environment and determine whether a user's face is present in block 202.

In response to determining that the user is engaged (i.e., determination block 206="Yes"), the processor may identify or determine the application (e.g., video player, HVAC control system, etc.) with which the user is engaged in block 208. For example, the processor may determine that the user is engaged with a specific type of video player (e.g., Apple TV, YouTube, etc.) that is operating in the foreground of a smart TV device in block 208.

In block 210, the processor may determine the current operating state (e.g., is playing movie, is cooling, etc.) of the application or its associated device. In block 212, the processor may determine the commands (e.g., "PAUSE," "STOP," "FAN OFF," etc.) that are applicable to the determined current operating state. In block 214, the processor may use the determined commands to query a datastore of comparison sequences, and select a small subset of the stored comparison sequences that correspond to the determined commands.

In block 216, the processor may capture user's lip sequence over a timeline and generate one or more captured sequence information structures. The processor may capture the user's lip sequence and/or generate the captured sequence information structures using any or all of the techniques disclosed in this application or known in the art. For example, the processor may transmit LIDAR signals, capture their reflections off certain points on the user's face (e.g., areas surrounding the user's mouth or lips, etc.), use captured reflections to identify edge points of the user's lips, determine the angles between the edge points, compute a polygon based on the edge points and angles, and generate the captured sequence information structure based on the computed polygon.

In block 218, the processor may generate a reduction sequence based on the user's lip sequences or the generated captured sequence information structures. The reduction sequences may include a subset of the information included in the captured sequences. For example, if the captured sequences include polygons or image frames that identify the shape of the user's mouth at every millisecond, the reduction sequences may include polygons or image frames that that identify significant changes in the shape of the user's mouth.

In some embodiments, the processor may generate a reduction sequence in block 218 by selecting a polygon value of a first record included in an sequentially ordered list of captured sequence information structures, adding the selected polygon value and its capture time to a list of reduction sequences, and traversing the sequentially ordered list of captured sequence information structures to determine whether the differences between the selected polygon value and the polygon values of subsequent records exceed a threshold. In response to determining that differences between the selected polygon value and a polygon value of a subsequent record exceeds the threshold, the processor may add the polygon value and it's capture time as the next record in the list of reduction sequences. The processor may select the most-recently added polygon value and repeat the operations above until all the captured sequences have been evaluated.

In determination block 220, the processor may determine whether the generated reduction sequence matches any of the comparison sequences selected in block 214. In response to determining that the generated reduction sequence does not match any of the selected comparison sequences (i.e., determination block 220="No"), the processor may continue to continuously or periodically scan its physical environment and determine whether a user's face is present in block 202. In response to determining that the generated reduction sequence matches one of the selected comparison sequences (i.e., determination block 220="Yes"), the processor may select the command associated with the matching comparison sequence in block 222. In block 224, the processor may send the selected command to the device and/or application.

Figure 2B:
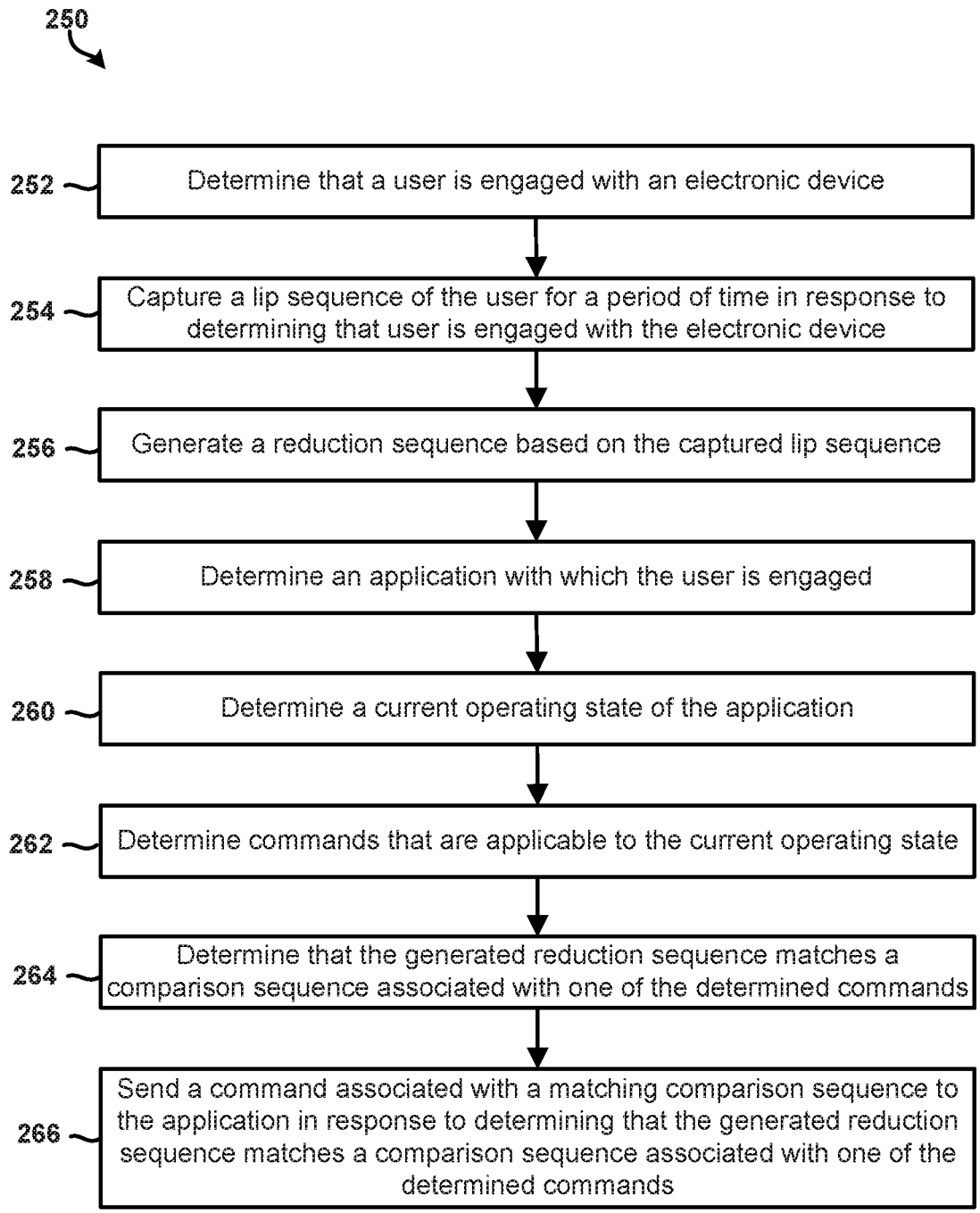

FIG. 2B illustrates another method 250 of using lip sequences to control the operations of a device (e.g., smart television 100 illustrated in FIG. 1A, television 144 illustrated in FIG. 1B, cable set top box 148 illustrated in FIG. 1C, etc.) in accordance with some embodiments. Method 250 may be performed by a processor (e.g., 102) that is included in, or communicatively coupled to, the device that is controlled (e.g., smart television 100 illustrated in FIG. 1A, television 144 illustrated in FIG. 1B, cable set top box 148 illustrated in FIG. 1C, etc.). Method 250 may be performed after the processor downloads from a cloud server or otherwise receives and stores comparison sequences in a datastore.

In block 252, the processor may determine whether a user is engaged with an electronic device. For example, the processor may work in conjunction with the facial/image sensors of the electronic device to determine that the user is looking towards an electronic display of the electronic device, and thus that the user is engaged with the electronic device. In block 254, the processor may capture a lip sequence of the user for a period of time in response to determining that user is engaged with the electronic device. For example, the processor may work in conjunction with a facial sensor to transmit LIDAR signals towards a face of a user, capture reflections of the LIDAR signals off points on the face of the user, use the captured reflections to identify points (and angles) on lips of the user, and determine a polygon based on the identified points (and angles).

In some embodiments, as part of the operations in block 254, the processor may generate a captured sequence information structure based on the determined polygon and/or to include the determined polygon. As discussed above, a captured sequence information structure may characterize a sequence of lip movements over a timeline via a plurality of values, which may include any or all of edge point values, vertex values, corner values, side values, angle values, capture time values, polygon values, and/or frames.

In block 256, the processor may generate a reduction sequence based on the captured lip sequence. For example, the processor may generate the reduce sequence based on the generated captured sequence information structure generated in block 254. In block 258, the processor may determine an application with which the user is engaged. For example, the processor may select an application (e.g., video player, audio player, web-app, etc.) operating in the foreground of the electronic device (or displayed on the foreground of the electronic display, running on the processor, consuming the most processor cycles, issuing application programming interface (API) calls to display component, etc.).

In block 260, the processor may determine a current operating state of the application (e.g., is playing movie, displaying a media guide, paused on audio, etc.). In block 262, the processor may determine commands that are applicable to the application in its current operating state. For example, if the application is a media player, its associated commands may include any or all of play, pause, toggle, reverse, rewind, fast forward, stop, off, exit, skip to the start or previous file/track/chapter, skip to the end or next file/track/chapter, record, eject, shuffle, repeat, info, menu, guide, reload, and refresh. If the media player is in a paused operating state, the commands that are applicable to the current operating state may simply include play, stop, off, rewind, and fast forward.

In block 264, the processor may determine whether the generated reduction sequence matches a comparison sequence associated with one of the determined commands. The processor may determine that a reduction sequence matches a comparison sequence in response to determining that all or many of the polygons in the reduction sequence are the same or similar to their corresponding polygons (matched up in time or sequence) in the comparison sequence. In some embodiments, the processor may be configured to determine that a first polygon (e.g., in a reduction sequence) is similar to a second polygon (e.g., in a comparison sequence) in response to determining that their corresponding angles are congruent and the measures of their corresponding sides are proportional. In block 266, the processor may send a command associated with a matching comparison sequence to the application in response to determining that the generated reduction sequence matches a comparison sequence associated with one of the determined commands.

As part of the operations in blocks 202-224 and 252-266, the processor may use any number of different solutions (e.g., trilateration, DOF, TOF, AOA, etc.) to determine distances and the location, position, orientation, etc. of the user's head or facial features. For example, the processor may determine a distance between the computing device (or the controlled device) and the head, face, lips or eyes of the user based on a TOF measurement. As another example, the processor may perform a 6-DOF computation based on the captured reflections to determine a surge, sway, heave, roll, pitch and yaw of the user's head or facial features (e.g., eyes, lips, etc.). The processor may use these computations (e.g., surge, sway, heave, roll, pitch and yaw) to determine the precise orientation of the user's head, determine whether the user is engaged with the electronic device (e.g., in blocks 206, 252, etc.), to process the collected lip sequence data, to generate the polygons or polygon meshes (e.g., a collection of vertices, edges and sides that define a polyhedral object in three dimensional computer graphics, etc.), to generate the captured sequence information structures, to adjust the lip sequence or polygon data when comparing the captured or reduction sequences to the comparison sequences (e.g., in blocks 220, 264, etc.).

Figure 3:
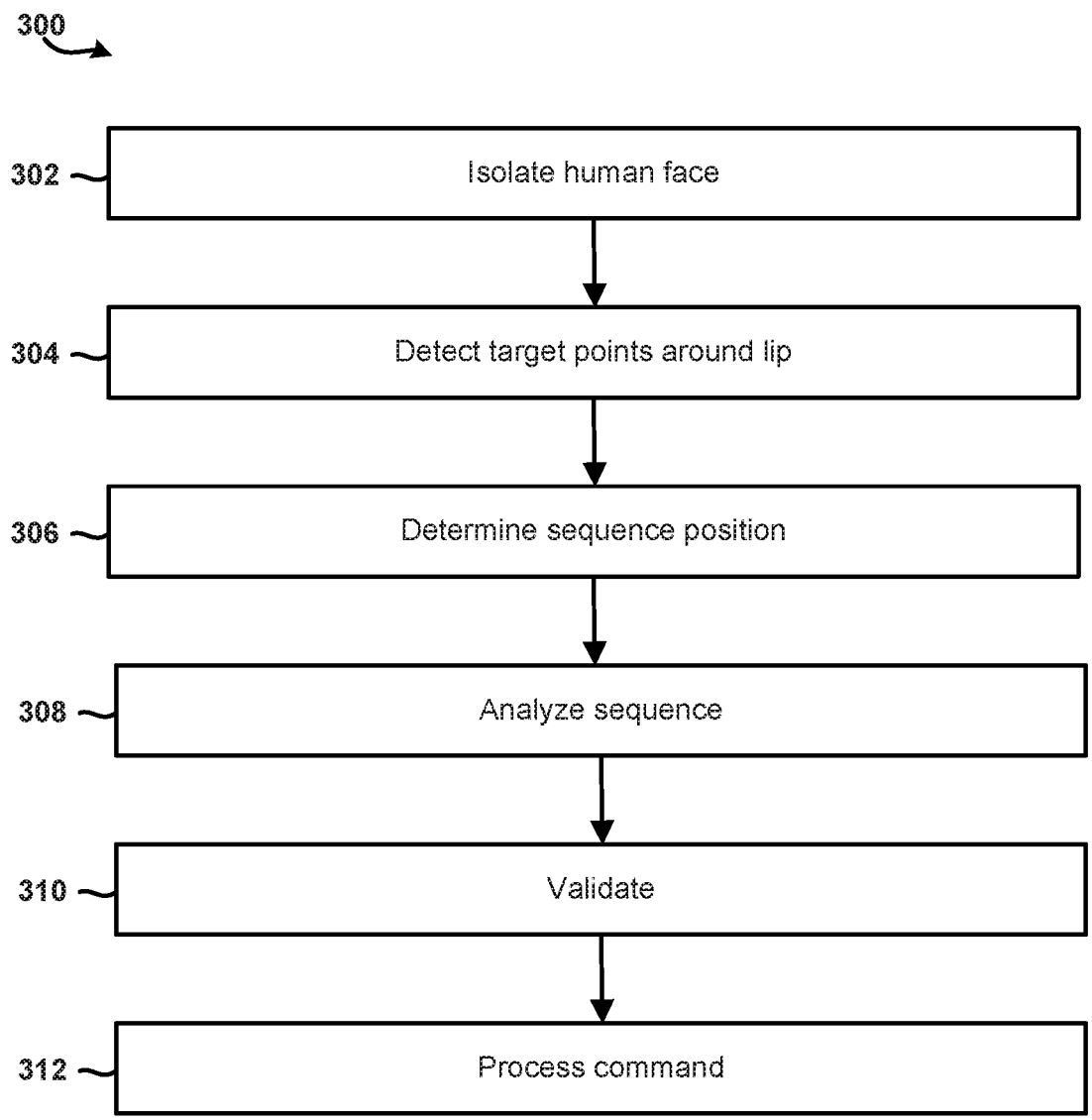
FIG. 3 is process flow diagram illustrating another method of using lip sequences to control the operations of an application or device in accordance with some embodiments.

FIG. 3 illustrates yet another method 300 of using lip sequences to control the operations of a device (e.g., smart television 100 illustrated in FIG. 1A, television 144 illustrated in FIG. 1B, cable set top box 148 illustrated in FIG. 1C, etc.) in accordance with some embodiments. Method 300 may be performed by a processor (e.g., 102) that is included in, or communicatively coupled to, the device that is controlled (e.g., smart television 100 illustrated in FIG. 1A, television 144 illustrated in FIG. 1B, cable set top box 148 illustrated in FIG. 1C, etc.). Method 300 may be performed after the processor downloads from a cloud server or otherwise receives and stores comparison sequences in a datastore.

In block 302, the processor (e.g., 102) may use scans from a LIDAR sensor/module to locate a face within captured three-dimensional frames. In block 304, the processor may use the LIDAR data to identify/detect a lip area of the user. To improve performance, the processor may capture or process only a minimal number of points in blocks 302 and/or 304. For example, four points could be used (edges and mid-point for upper and lower lips) to determine the lip area.

In block 306, the processor may determine a sequence position for the user's lips. For example, the processor may determine that the system is at a start position when it starts to capture lip frames. The processor may tag a frame as an end position when the capture sequence is classified as a pre-set command. All sequences in-between may be stored in a local database with a pre-set threshold. If no command can be extracted, the processor may free up the memory and reset the sequence.

In block 308, the processor may analyze the sequence. In some embodiments, the processor may analyze the sequence so as to save power and achieve optimum performance. For example, the processor may capture a sequence of snap shots of the lip through a timeline, drop any frame that does not differ from the prior one by a preset threshold (e.g., to ensure only a minimal number of frames are captured and later processed), and classify the remaining captured frames. The processor may classify the frames by comparing them with a preset number of sequences stored in the local memory/database. The preset sequences may be downloaded from a cloud network on a periodic basis. The preset sequences used by the processor may be within a pre-determined context linked to the displayed screen. For instance, if the screen is playing a movie, then the preset sequences used by the processor would only include: "PAUSE", "STOP", "MENU", etc. This may greatly reduce the number of templates/sequences that processor evaluates for the classification, thereby reducing power consumption and improving processing/classification times.

In block 310, the processor may validate the classification, sequence and/or command. The validation operation may ensure that the captured sequence corresponds to a command that is valid within the context. If validation fails, the processor may reject the sequences and reset. If the validation is successful, the processor may generate the command.

In block 312, the processor (or a corresponding device processor) may implement the generated command. For example, the processor may send a "PAUSE", "STOP", or "MENU" command to a video system to be processed.

Although methods 200 and 300 may be performed on the 'Edge' where all processing is handled on the control system/smart device, there are certain operations that could be handled on the cloud. For example, a server in a cloud network may store and transmit a pre-set of sequences to the Edge devices so they can be used locally. In addition, a device configured in accordance with the embodiments may transmit certain sequences to the cloud network for use in further enhancing the experience. For example, a server in the cloud network may use the data received from the device to eliminate duplicate sequences, which could reduce the size of the downloaded dataset.

Although the system can operate without user training, a manual training process may be triggered due to variance in regional dialects and even languages. A control system/smart device configured in accordance with the embodiments may trigger this process when the user selects an option corresponding to this task. The collected data could also be sent to the cloud to enhance the performance of the system by enabling the system to accurately read commands from other users who speak the same way.

Figure 4A:
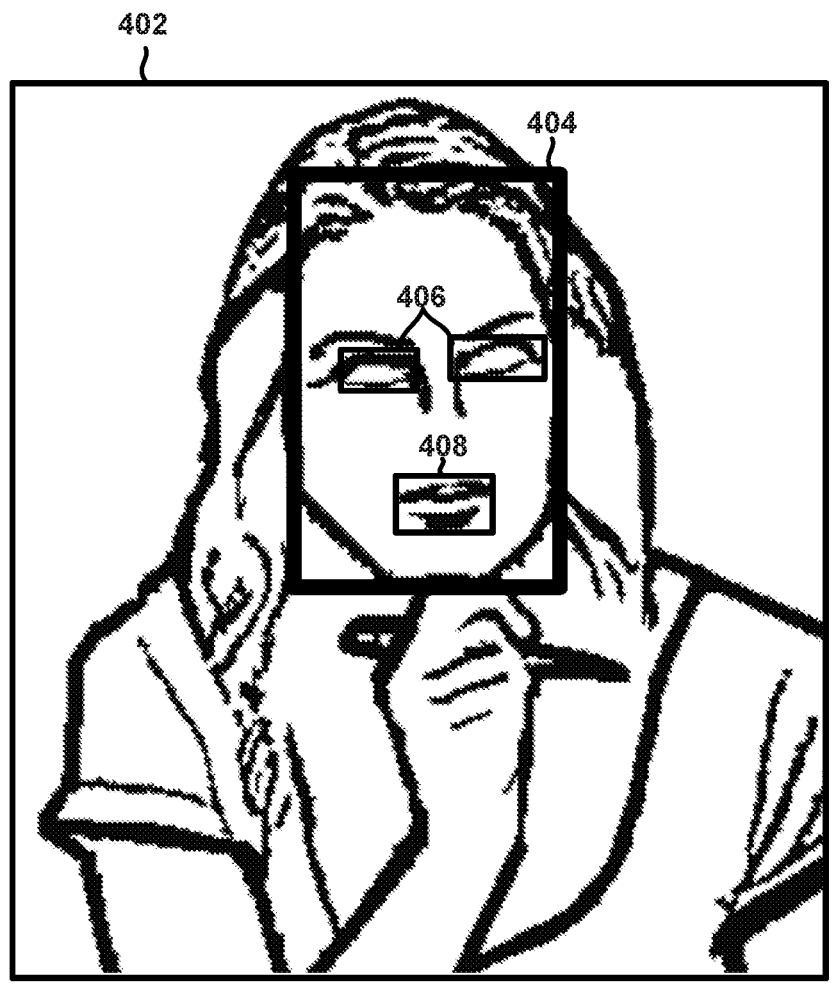
FIGS. 4A and 4B are illustrations of an example frame or data that may be captured and analyzed by a device that is configured to use lip sequences to control the operations of an application or device in accordance some embodiments.
Figure 4B:

FIGS. 4A and 4B illustrate an example frame 402 that may be captured by a control system/smart device configured in accordance the embodiments. FIG. 4A illustrates that the control system/smart device may locate a user's face area 404 within a captured frame 402, and locate eye areas 406 and/or a lip area 408 within the face area 404. FIG. 4B illustrates that the device may capture or process number of points (e.g., four points A, B, C, D) that represent the lips of the user. In the example illustrate in FIG. 4B, the points represent the edges of the lips (e.g., points A and C), the mid-point for upper lip (e.g., point B), and the mid-point for lower lip (e.g., point D).

Figure 5A:
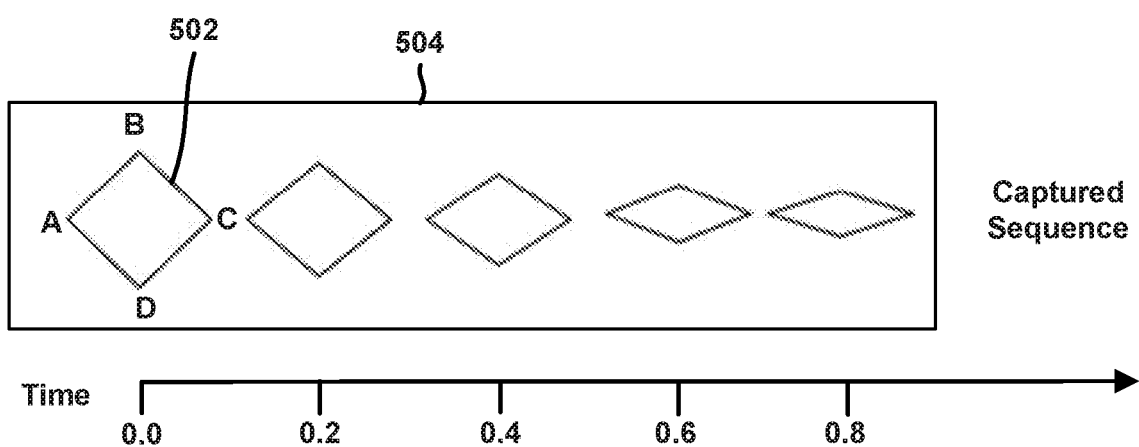
FIG. 5A is a chart illustrating that a device configured in accordance the embodiments may use captured data points (e.g., A, B, C, D) to determine/compute polygon shapes that each identifies a shape of the user's lips at a point in time.

FIG. 5A illustrates that a device configured in accordance the embodiments may use the points (e.g., A, B, C, D) representing the lips of the user to determine/compute a polygon shape 502 (e.g., a quadrilateral shape, etc.) that identifies a shape of the user's lips at a point in time (e.g., t=0.00, etc.). A captured sequence 504 of polygon shapes over a period of time (e.g., 0.8 seconds in FIG. 5A) may identify a pattern of captured lip movements that could correspond to a command.

Figure 5B:
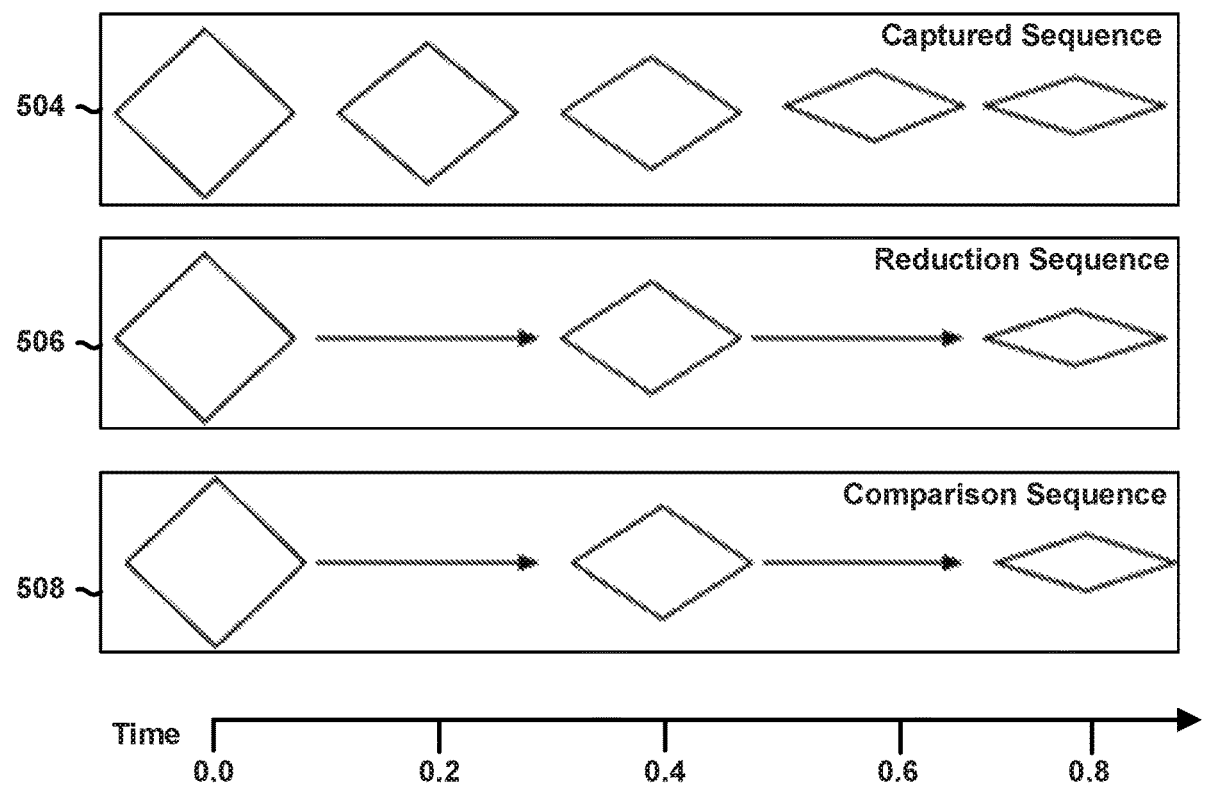
FIG. 5B is a chart illustrating the relationships between a captured sequence, a reduction sequence, and a comparison (matching) sequence.

FIG. 5B illustrates the relationship between the captured sequence 504, a reduction sequence 506, and a comparison sequence 508. In particular, FIG. 5B illustrates that the reduction sequence 506 may include a subset of the polygons included in the captured sequence 504. For example, the captured sequence 504 includes polygons that identify the shape of the user's mouth at 0.0, 0.2, 0.4, 0.6 and 0.8 seconds. The corresponding reduction sequence 506 includes only the polygons that identify the shape of the user's mouth at 0.0, 0.4, and 0.8 seconds, each of which identifies a significant change in the shape of the user's mouth. The comparison sequence 508 include reference or test values (e.g., a sequence of reference polygons, etc.) to which the reduction sequence 506 may be compared.

Figure 6:
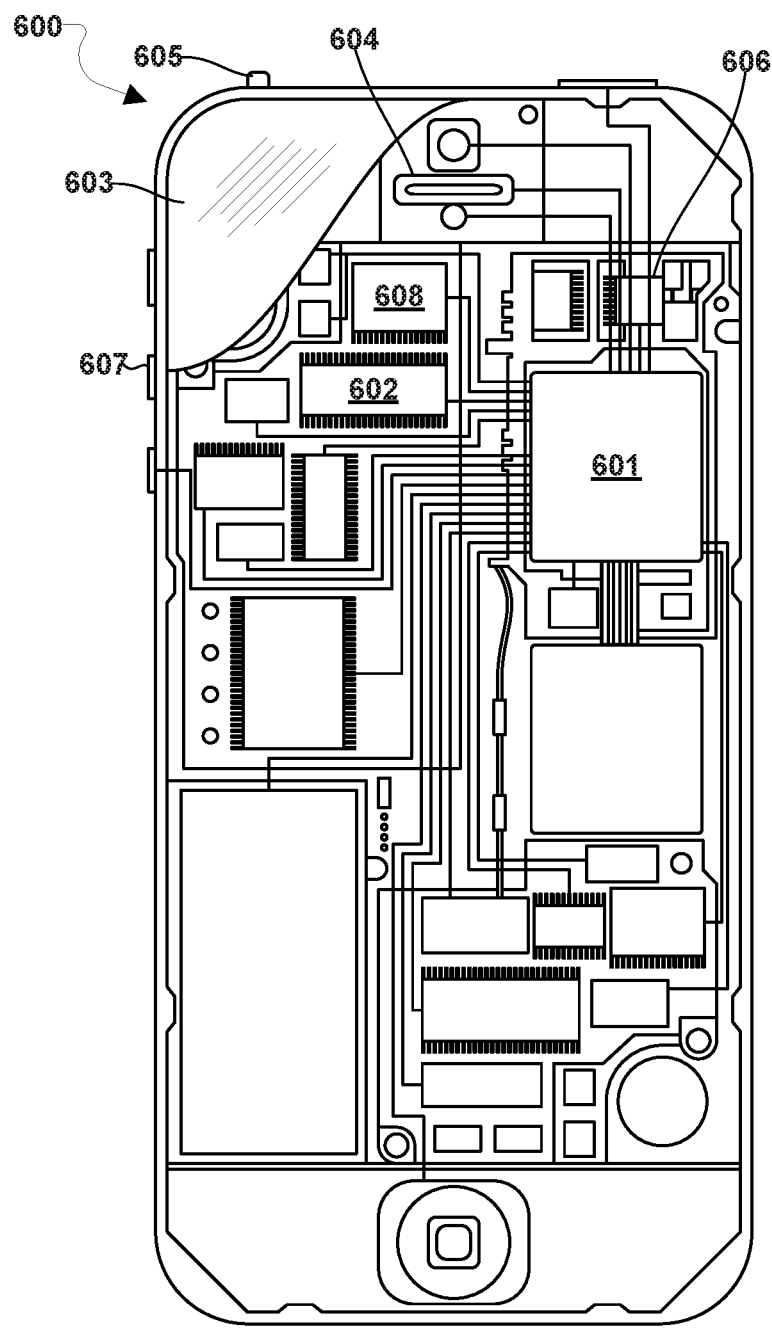
FIG. 6 is a component block diagram of a user equipment device in the form of smartphone that is suitable for implementing some embodiments.

Various embodiments may be implemented on a variety of computing devices, an example of which in the form of a smartphone 600 is illustrated in FIG. 6. A smartphone 600 may include a processor 601 coupled to a facial sensor, an image sensor, a sensor array, and other components so that the processor 601 perform any of the processing in any of the methods 200 or 300. In the example illustrated in FIG. 6, the processor 601 is coupled to an internal memory 602, a display 603, a speaker 604, an antenna 605, and a wireless transceiver 606 for sending and receiving wireless signals. Smartphones 600 typically also include menu selection buttons or rocker switches 607 for receiving user inputs.

A typical smartphone 600 also includes a sound encoding/decoding (CODEC) circuit 608, which digitizes sound received from a microphone into data packets suitable for wireless transmission and decodes received sound data packets to generate analog signals that are provided to the speaker to generate sound. Also, one or more of the processors 601, wireless transceiver 606 and CODEC 608 may include a digital signal processor (DSP) circuit (not shown separately).

Figure 7:
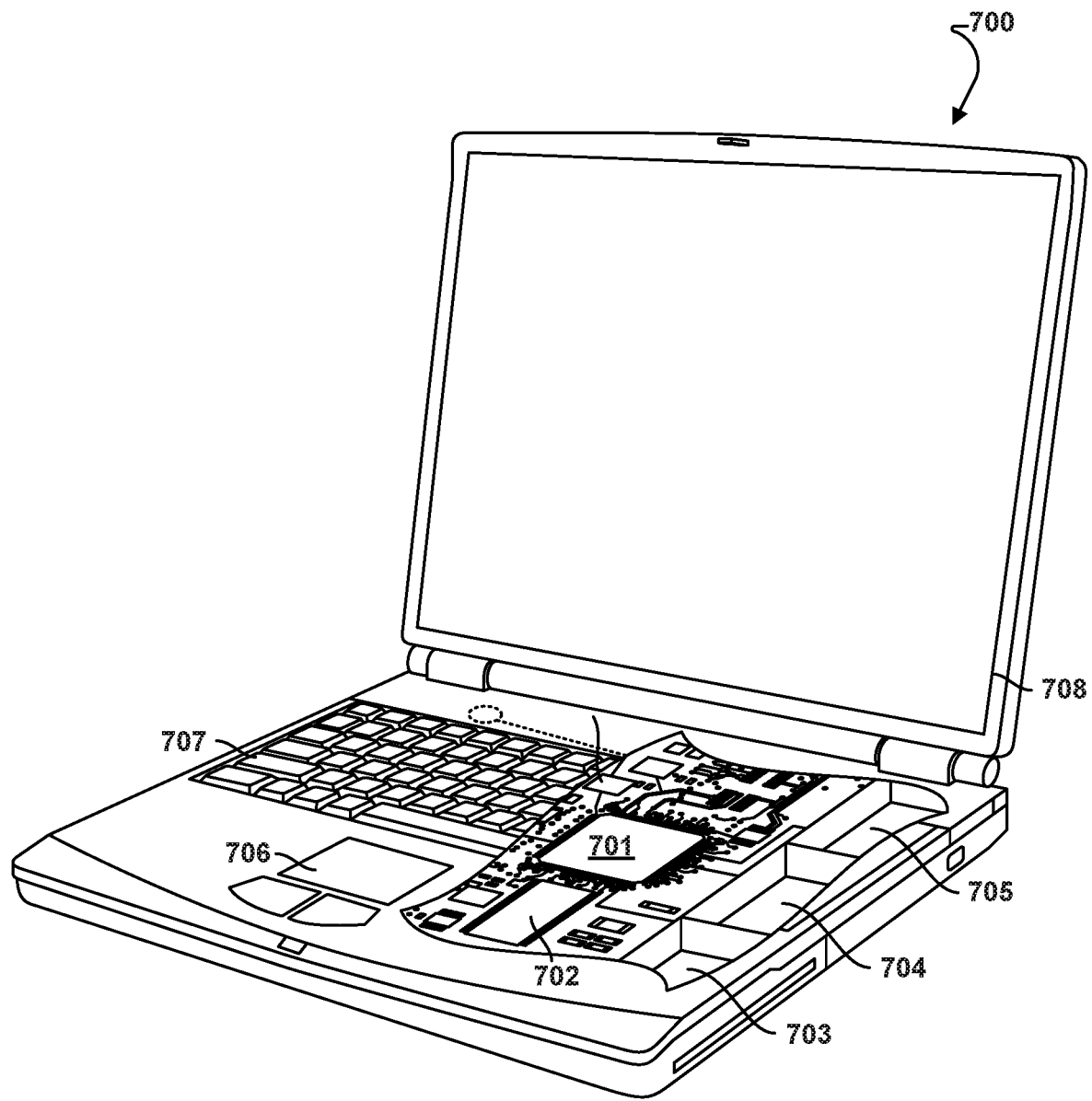
FIG. 7 is a component block diagram of a user equipment device in the form of laptop that is suitable for implementing some embodiments.

Various embodiment may be implemented in the laptop computer 700 illustrated in FIG. 7. A laptop computer 700 may include a processor 701 coupled to a facial sensor, an image sensor, a sensor array, and other components so that the processor 701 perform any of the processing in any of the methods 200 or 300. The processor 701 may be coupled to volatile memory 702 and a large capacity nonvolatile memory, such as a disk drive 703 of Flash memory. The laptop computer 700 may also include a floppy disc drive 704 coupled to the processor 701. The laptop computer 700 may also include a number of connector ports 705 or other network interfaces coupled to the processor 701 for establishing data connections, such as a Universal Serial Bus (USB) or FireWire® connector sockets, or other network connection circuits for coupling the processor 701 to a network (e.g., a communications network). In a notebook configuration, the laptop computer 700 may include a touchpad 706, the keyboard 707, and a display 708 all coupled to the processor 701. Other configurations of computing devices may include a computer mouse or trackball coupled to the processor (e.g., via a USB input) as are well known, which may also be used in conjunction with various embodiments.

Figure 8:
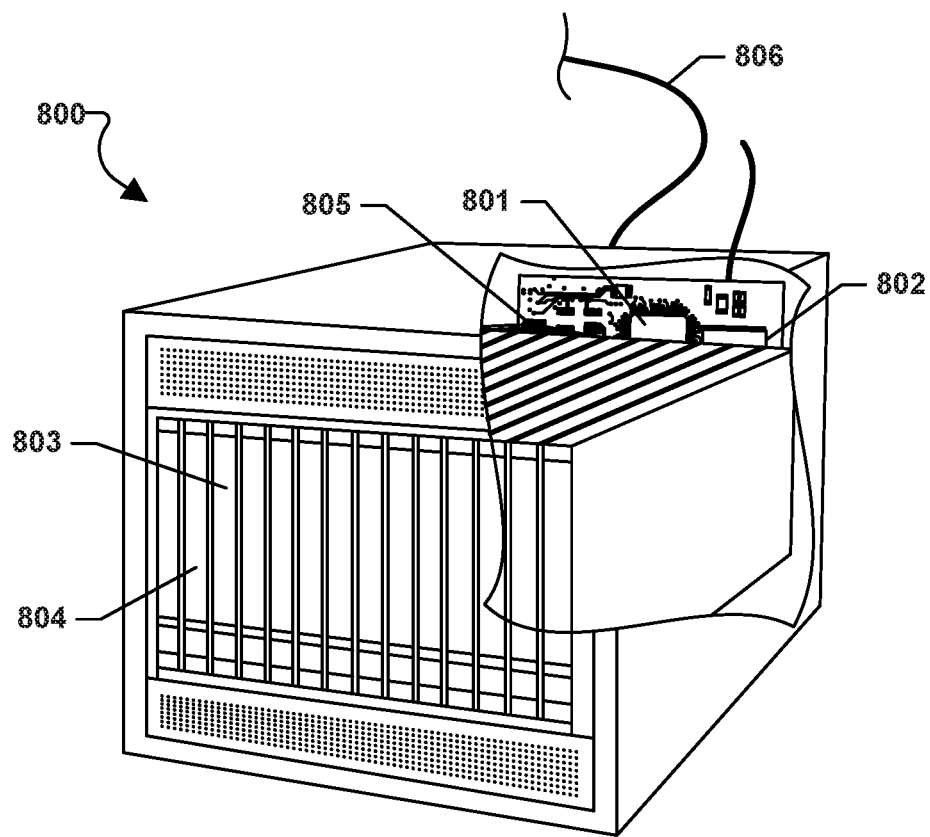
FIG. 8 is a component diagram of an example server suitable for use with some embodiments.

Some embodiments may be implemented on any of a variety of commercially available server devices deployed in a cloud network, such as the server device 800 illustrated in FIG. 8. Such a server device 800 may include a processor 801 coupled to volatile memory 802 and a large capacity nonvolatile memory, such as a disk drive 803. The processor 801 may store and/or transmit a pre-set of sequences to the user devices (e.g., devices 100, 600, 700, etc.) so they can be used locally by those devices. The processor 801 may use data received from user devices to eliminate duplicate sequences, which could reduce the size of the downloaded dataset. The server device 800 may also include a floppy disc drive, compact disc (CD) or DVD disc drive 804 coupled to the processor 801. The server device 800 may also include network access ports 806 coupled to the processor 801 for establishing data connections with a network connection circuit 805 and a communication network (e.g., internet protocol (IP) network) coupled to other communication system network elements.

The processors 102, 601, 701, 801 may be any programmable microprocessor, microcomputer or multiple processor chip or chips that may be configured by software instructions (applications) to perform a variety of functions, including the functions of the various embodiments described in this application. In some mobile devices, multiple processors may be provided, such as one processor dedicated to wireless communication functions and one processor dedicated to running other applications. Typically, software applications may be stored in the internal memory before they are accessed and loaded into the processor. The processor 102, 601, 701, 801 may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments may be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, functional components, functionality components, circuits, and algorithm operations described in connection with the embodiments disclosed herein may be implemented as electronic hardware, computer software, or combinations of both. To clearly illustrate this interchangeability of hardware and software, various illustrative components, blocks, functional components, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement the various illustrative logics, logical blocks, functional components, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of controlling a device, comprising:
   determining, by a processor in a user equipment device, whether a user is engaged with an electronic device;
   capturing, by the processor in the user equipment device, a lip sequence of the user for a period of time in response to determining that the user is engaged with the electronic device, wherein capturing the lip sequence of the user for the period of time comprises:
   transmitting light detection and ranging (LIDAR) signals towards a face of the user;
   capturing reflections of the LIDAR signals off points on the face of the user; and
   using the captured reflections to identify the points on lips of the user;
   generating, by the processor in the user equipment device, a reduction sequence based on the captured lip sequence, wherein the generated reduction sequence is an information structure that includes a subset of the information included in the captured lip sequence;
   determining, by the processor in the user equipment device, an application with which the user is engaged;
   determining, by the processor in the user equipment device, a current operating state of the application;
   determining, by the processor in the user equipment device, commands that are applicable to the current operating state;
   determining, by the processor in the user equipment device, whether the generated reduction sequence information structure matches a comparison sequence associated with one of the determined commands; and
   controlling, by the processor in the user equipment device, the device by sending a command associated with a matching comparison sequence to the application in response to determining that the generated reduction sequence information structure matches the comparison sequence associated with one of the determined commands.

2. The method of claim 1, wherein capturing the lip sequence of the user for the period of time comprises:
   determining a polygon based on the identified points on the lips of the user.

3. The method of claim 2, wherein:
   using the captured reflections to identify the points on the lips of the user comprises using the captured reflections to identify the points and angles; and
   determining the polygon based on the identified points comprises determining the polygon based on the identified points and the identified angles.

4. The method of claim 2, further comprising generating a captured sequence information structure based on the determined polygon, wherein generating the reduction sequence based on the captured lip sequence comprises generating the reduction sequence based on the generated captured sequence information structure.

5. The method of claim 1, wherein determining the application with which the user is engaged comprises selecting the application operating in the foreground of the electronic device.

6. The method of claim 5, wherein selecting the application operating in the foreground of the electronic device comprises selecting a video player application operating in the foreground of the electronic device.

7. The method of claim 1, wherein determining whether the user is engaged with the electronic device comprises determining whether the user is looking towards an electronic display of the electronic device.

8. The method of claim 1, wherein:
   the user equipment device is a stand-alone control system device;
   the electronic device is a smart television; and
   the device is a set top box.

9. The method of claim 1, wherein:
   the user equipment device is a set top box; and
   the electronic device and the device are combined into a single component, wherein the single component is a smart television device.

10. The method of claim 1, wherein the user equipment device, the electronic device and the device are combined into a single component, wherein the single component is a smart television device.

11. A user equipment device, comprising:
a light detection and ranging (LIDAR) signal transmitter and receiver; and
a processor configured with processor-executable instructions to:
  determine whether a user is engaged with an electronic device;
  capture a lip sequence of the user for a period of time in response to determining that the user is engaged with the electronic device, by:
    transmitting light detection and ranging (LIDAR) signals towards a face of the user;
    capturing reflections of the LIDAR signals off points on the face of the user; and
    using the captured reflections to identify the points on lips of the user;
  generate a reduction sequence based on the captured lip sequence, wherein the generated reduction sequence is an information structure that includes a subset of the information included in the captured lip sequence;
  determine an application with which the user is engaged;
  determine a current operating state of the application;
  determine commands that are applicable to the current operating state;
  determine whether the generated reduction sequence information structure matches a comparison sequence associated with one of the determined commands; and
  control a device by sending a command associated with a matching comparison sequence to the application in response to determining that the generated reduction sequence information structure matches the comparison sequence associated with one of the determined commands.

12. The user equipment device of claim 11, wherein the processor is configured to capture the lip sequence of the user for the period of time by:
  determining a polygon based on the identified points on the lips of the user.

13. The user equipment device of claim 12, wherein the processor is configured to:
  use the captured reflections to identify the points on the lips of the user by using the captured reflections to identify the points and angles; and
  determine the polygon based on the identified points by determining the polygon based on the identified points and the identified angles.

14. The user equipment device of claim 12, wherein:
the processor is further configured to generate a captured sequence information structure based on the determined polygon; and
the processor is configured to generate the reduction sequence based on the captured lip sequence by generating the reduction sequence based on the generated captured sequence information structure.

15. The user equipment device of claim 11, wherein the processor is configured to determine the application with which the user is engaged by selecting the application operating in the foreground of the electronic device.

16. The user equipment device of claim 15, wherein the processor is configured to select the application operating in the foreground of the electronic device by selecting a video player application operating in the foreground of the electronic device.

17. The user equipment device of claim 11, wherein the processor is configured to determine whether the user is engaged with the electronic device by determining whether the user is looking towards an electronic display of the electronic device.

18. The user equipment device of claim 11, wherein:
the user equipment device is a stand-alone control system device;
the electronic device is a smart television; and
the device is a set top box.

19. The user equipment device of claim 11, wherein:
the user equipment device is a set top box; and
the electronic device and the device are integrated into a single component, wherein the single component is a smart television device.

20. The user equipment device of claim 11, wherein the user equipment device, the electronic device and the device are integrated into a single component, wherein the single component is a smart television device.

21. A non-transitory computer readable storage medium having stored thereon processor-executable software instructions configured to cause a processor in a user equipment device to perform operations for controlling a device, the operations comprising:
  determining whether a user is engaged with an electronic device;
  capturing a lip sequence of the user for a period of time in response to determining that the user is engaged with the electronic device, wherein capturing the lip sequence of the user for the period of time comprises:
    transmitting light detection and ranging (LIDAR) signals towards a face of the user;
    capturing reflections of the LIDAR signals off points on the face of the user; and
    using the captured reflections to identify the points on lips of the user;
  generating a reduction sequence based on the captured lip sequence, wherein the generated reduction sequence is an information structure that includes a subset of the information included in the captured lip sequence;
  determining an application with which the user is engaged;
  determining a current operating state of the application;
  determining commands that are applicable to the current operating state;
  determining whether the generated reduction sequence information structure matches a comparison sequence associated with one of the determined commands; and
  controlling the device by sending a command associated with a matching comparison sequence to the application in response to determining that the generated reduction sequence information structure matches the comparison sequence associated with one of the determined commands.

22. The non-transitory computer readable storage medium of claim 21, wherein the stored processor-executable software instructions are configured to cause the processor to perform operations such that capturing the lip sequence of the user for the period of time comprises:
  determining a polygon based on the identified points on the lips of the user.

23. The non-transitory computer readable storage medium of claim 22, wherein the stored processor-executable software instructions are configured to cause the processor to perform operations such that:

using the captured reflections to identify the points on the lips of the user comprises using the captured reflections to identify the points and angles; and determining the polygon based on the identified points comprises determining the polygon based on the identified points and the identified angles.

24. The non-transitory computer readable storage medium of claim 22, wherein:

the stored processor-executable software instructions are configured to cause the processor to perform operations further comprising generating a captured sequence information structure based on the determined polygon; and the stored processor-executable software instructions are configured to cause the processor to perform operations such that generating the reduction sequence based on the captured lip sequence comprises generating the reduction sequence based on the generated captured sequence information structure.

25. The non-transitory computer readable storage medium of claim 21, wherein the stored processor-executable software instructions are configured to cause the processor to perform operations such that determining the application with which the user is engaged comprises selecting the application operating in the foreground of the electronic device.

26. The non-transitory computer readable storage medium of claim 25, wherein the stored processor-executable software instructions are configured to cause the processor to perform operations such that selecting the application operating in the foreground of the electronic device comprises selecting a video player application operating in the foreground of the electronic device.

27. The non-transitory computer readable storage medium of claim 21, wherein the stored processor-executable software instructions are configured to cause the processor to perform operations such that determining whether the user is engaged with the electronic device comprises determining whether the user is looking towards an electronic display of the electronic device.

28. The non-transitory computer readable storage medium of claim 21, wherein:

the user equipment device is a stand-alone control system device;

the electronic device is a smart television; and the device is a set top box.

29. The non-transitory computer readable storage medium of claim 21, wherein:

the user equipment device is a set top box; and the electronic device and the device are integrated into a single component, wherein the single component is a smart television device.

30. The non-transitory computer readable storage medium of claim 21, wherein the user equipment device, the electronic device and the device are integrated into a single component, wherein the single component is a smart television device.

* * * * *